United States Patent
Chu et al.

(10) Patent No.: US 10,231,148 B2
(45) Date of Patent: Mar. 12, 2019

(54) SIGNALING DATA UNIT FORMAT PARAMETERS FOR MULTI-USER TRANSMISSIONS

(71) Applicant: Marvell World Trade Ltd., St. Michael (BB)

(72) Inventors: Liwen Chu, San Ramon, CA (US); Leilei Song, Sunnyvale, CA (US); Ken Kinwah Ho, San Jose, CA (US); Tianan Tim Ma, Palo Alto, CA (US); Li-Fu Jeng, San Jose, CA (US); Seong Yong Park, San Jose, CA (US); Foo Keong Tang, San Jose, CA (US)

(73) Assignee: Marvell World Trade Ltd., St. Michael (BB)

( * ) Notice: Subject to any disclaimer, the term of this patent is extended or adjusted under 35 U.S.C. 154(b) by 0 days.

(21) Appl. No.: 15/487,717

(22) Filed: Apr. 14, 2017

(65) Prior Publication Data

US 2017/0303164 A1    Oct. 19, 2017

Related U.S. Application Data

(60) Provisional application No. 62/322,653, filed on Apr. 14, 2016.

(51) Int. Cl.
*H04W 28/06*     (2009.01)
*H04B 7/06*     (2006.01)
(Continued)

(52) U.S. Cl.
CPC .......... *H04W 28/06* (2013.01); *H04B 7/0452* (2013.01); *H04B 7/0686* (2013.01);
(Continued)

(58) Field of Classification Search
CPC ... H04W 28/06; H04W 72/042; H04W 80/02; H04W 84/12; H04L 1/0083; H04L 45/66;
(Continued)

(56) References Cited

U.S. PATENT DOCUMENTS

2015/0063111 A1*   3/2015   Merlin .................... H04L 47/12
                                                                   370/235
2016/0014804 A1*   1/2016   Merlin ................. H04L 5/0044
                                                                   370/329

FOREIGN PATENT DOCUMENTS

WO    WO-2012/021736 A1    2/2012

OTHER PUBLICATIONS

IEEE P802.11ax™/D0.1, "Draft Standard for Information technology—Telecommunications and information exchange between systems Local and metropolitan area networks—Specific Requirements, Part 11: Wireless LAN Medium Access Control (MAC) and Physical Layer (PHY) Specifications, Amendment 6: Enhancements for high efficiency in frequency bands between 1 GHz and 6 GHz," *IEEE Computer Society*, 221 pages (Mar. 2016).
(Continued)

*Primary Examiner* — Dady Chery

(57) ABSTRACT

A first communication device determines one or more parameters related to a format of a media access control layer (MAC) data unit for an uplink (UL) multi-user (MU) transmission. The format of the MAC data unit for the UL MU transmission is different than a format of a MAC data unit for an UL single user (SU) transmission. The first communication device generates one or more data units that include the one or more parameters. The first communication device transmits the one or more data units to a plurality of second communication devices to inform the plurality of second communication devices of the format of the MAC data unit for UL MU transmissions by the plurality of second communication devices to the first communication device.

16 Claims, 8 Drawing Sheets

(51) Int. Cl.
*H04L 12/721* (2013.01)
*H04B 7/0452* (2017.01)
*H04L 1/00* (2006.01)
*H04W 72/04* (2009.01)
*H04W 80/02* (2009.01)
*H04W 84/12* (2009.01)

(52) U.S. Cl.
CPC .......... *H04L 1/0083* (2013.01); *H04L 45/66* (2013.01); *H04W 72/042* (2013.01); *H04L 2001/0092* (2013.01); *H04W 80/02* (2013.01); *H04W 84/12* (2013.01)

(58) Field of Classification Search
CPC .......... H04L 2001/0092; H04B 7/0452; H04B 7/0686
See application file for complete search history.

(56) References Cited

OTHER PUBLICATIONS

IEEE P802.11ax™/D0.4, "Draft Standard for Information technology—Telecommunications and information exchange between systems Local and metropolitan area networks—Specific Requirements, Part 11: Wireless LAN Medium Access Control (MAC) and Physical Layer (PHY) Specifications, Amendment 6: Enhancements for High Efficiency WLAN," *IEEE Computer Society*, 317 pages (Aug. 2016).

IEEE P802.11ax™/D0.5, "Draft Standard for Information technology—Telecommunications and information exchange between systems Local and metropolitan area networks—Specific Requirements, Part 11: Wireless LAN Medium Access Control (MAC) and Physical Layer (PHY) Specifications, Amendment 6: Enhancements for High Efficiency WLAN (#1121)," *IEEE Computer Society*, 376 pages (Sep. 2016).

IEEE Std 802.11ac/D7.0 "Draft Standard for Information Technology—Telecommunications and information exchange between systems—Local and metropolitan area networks-Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-456 (Sep. 2013).

IEEE Std 802.11™ 2012 (Revision of IEEE Std 802.11-2007) IEEE Standard for Information technology—Telecommunications and information exchange between systems—Local and metropolitan area networks—Specific requirements Part 11: Wireless LAN Medium Access Control (MAC) and Physical Layer (PHY) specifications, *The Institute of Electrical and Electronics Engineers, Inc.*, pp. 1-2695 (Mar. 29, 2012).

International Search Report and Written Opinion in International Patent Application No. PCT/US2017/027598, dated Oct. 2, 2017 (12 pages).

\* cited by examiner

SIGNALING DATA UNIT FORMAT PARAMETERS FOR MULTI-USER TRANSMISSIONS

CROSS-REFERENCES TO RELATED APPLICATIONS

This application claims the benefit of U.S. Provisional Application No. 62/322,653, filed Apr. 14, 2016, entitled "MU Minimum MPDU Start Spacing and Maximum A-MPDU Length," which is hereby incorporated by reference herein in its entirety.

FIELD OF THE DISCLOSURE

The present disclosure relates generally to communication networks and, more particularly, to multi-user transmission in wireless local area networks (WLAN).

BACKGROUND

Wireless local area network (WLAN) technology has evolved rapidly over the past two decades. Development of WLAN standards such as the Institute for Electrical and Electronics Engineers (IEEE) 802.11a, 802.11b, 802.11g, 802.11n, and 802.11ac Standards has improved single-user peak data throughput. For example, the IEEE 802.11b Standard specifies a single-user peak throughput of 11 megabits per second (Mbps), the IEEE 802.11a and 802.11g Standards specify a single-user peak throughput of 54 Mbps, the IEEE 802.11n Standard specifies a single-user peak throughput of 600 Mbps, and the IEEE 802.11ac Standard specifies a single-user peak throughput in the gigabits per second (Gbps) range. Future standards promise to provide even greater throughput, such as throughputs in the tens of Gbps range.

SUMMARY

In an embodiment, a method for communicating in a wireless communication network includes: determining, at a first communication device, one or more parameters related to a format of a media access control layer (MAC) data unit for an uplink (UL) multi-user (MU) transmission, wherein the format of the MAC data unit for the UL MU transmission is different than a format of a MAC data unit for an UL single user (SU) transmission; generating, at the first communication device, one or more data units that include the one or more parameters; and transmitting, by the first communication device, the one or more data units to a plurality of second communication devices to inform the plurality of second communication devices of the format of the MAC data unit for UL MU transmissions by the plurality of second communication devices to the first communication device.

In another embodiment, an apparatus comprises a network interface device associated with a first communication device, the network interface device implemented using one or more integrated circuits (ICs). The network interface device includes: a media access control layer (MAC) processor implemented using the one or more ICs, and a physical layer (PHY) processor implemented using the one or more ICs. The one or more ICs are configured to: determine one or more parameters related to a format of a MAC data unit for an uplink (UL) multi-user (MU) transmission, wherein the format of the MAC data unit for the UL MU transmission is different than a format of a MAC data unit for an UL single user (SU) transmission; generate one or more data units that include the one or more parameters; and cause the first communication device to transmit the one or more data units to a plurality of second communication devices to inform the plurality of second communication devices of the format of the MAC data unit for UL MU transmissions by the plurality of second communication devices to the first communication device.

DETAILED DESCRIPTION

In embodiments described below, a wireless network device such as an access point (AP) of a wireless local area network (WLAN) receives single-user (SU) and multi-user (MU) physical layer (PHY) data units from multiple client stations. In both SU PHY data units and MU PHY data units, multiple media access control layer (MAC) frames can be aggregated within one PHY data unit (e.g., multiple MAC protocol data units (MPDUs) aggregated together in an aggregated MPDU (A-MPDU)). To help ensure that the AP can properly process an A-MPDU from a client station, the AP may first transmit one or more A-MPDU-related parameters to the client station to indicate certain limits on how A-MPDUs can be generated by the client station. For example, such parameters may include one or both of i) a parameter that specifies a minimum spacing between the starts of two adjacent MPDUs (referred to by the IEEE 802.11 Standard as the "Minimum MPDU Start Spacing" parameter), and ii) a parameter that specifies a maximum length of an A-MPDU (referred to by the IEEE 802.11 Standard as the "Maximum A-MPDU Length Exponent"

parameter). Similarly, to help ensure that the client station can properly process an A-MPDU from the AP, the client station may first transmit one or more A-MPDU-related parameters to the AP to indicate certain limits on how A-MPDUs for the client station can be generated by the AP.

An A-MPDU-related parameter, however, may not have a consistent effect for both SU PHY data units and MU PHY data units. As an illustrative example in which the AP specifies a parameter specifying a minimum spacing between the starts of two adjacent MPDUs, a client station will transmits an A-MPDU to the AP that complies with the parameter. If the A-MPDU is part of a MU PHY data unit that includes multiple A-MPDUs from multiple stations, however, the spacing of MPDUs within the MU PHY data unit overall may not comply with the parameter, even though each A-MPDU may individually comply with the parameter. Thus, in embodiments described below, the AP transmits additional MU-related information, i.e., in addition to the one or more A-MPDU-related parameters, to the client stations so that the client stations can determine limits on how A-MPDUs for MU PHY data units can be generated by the client station to help ensure that the AP can properly process A-MPDUs included in MU PHY transmissions from the client stations.

Figure 1:
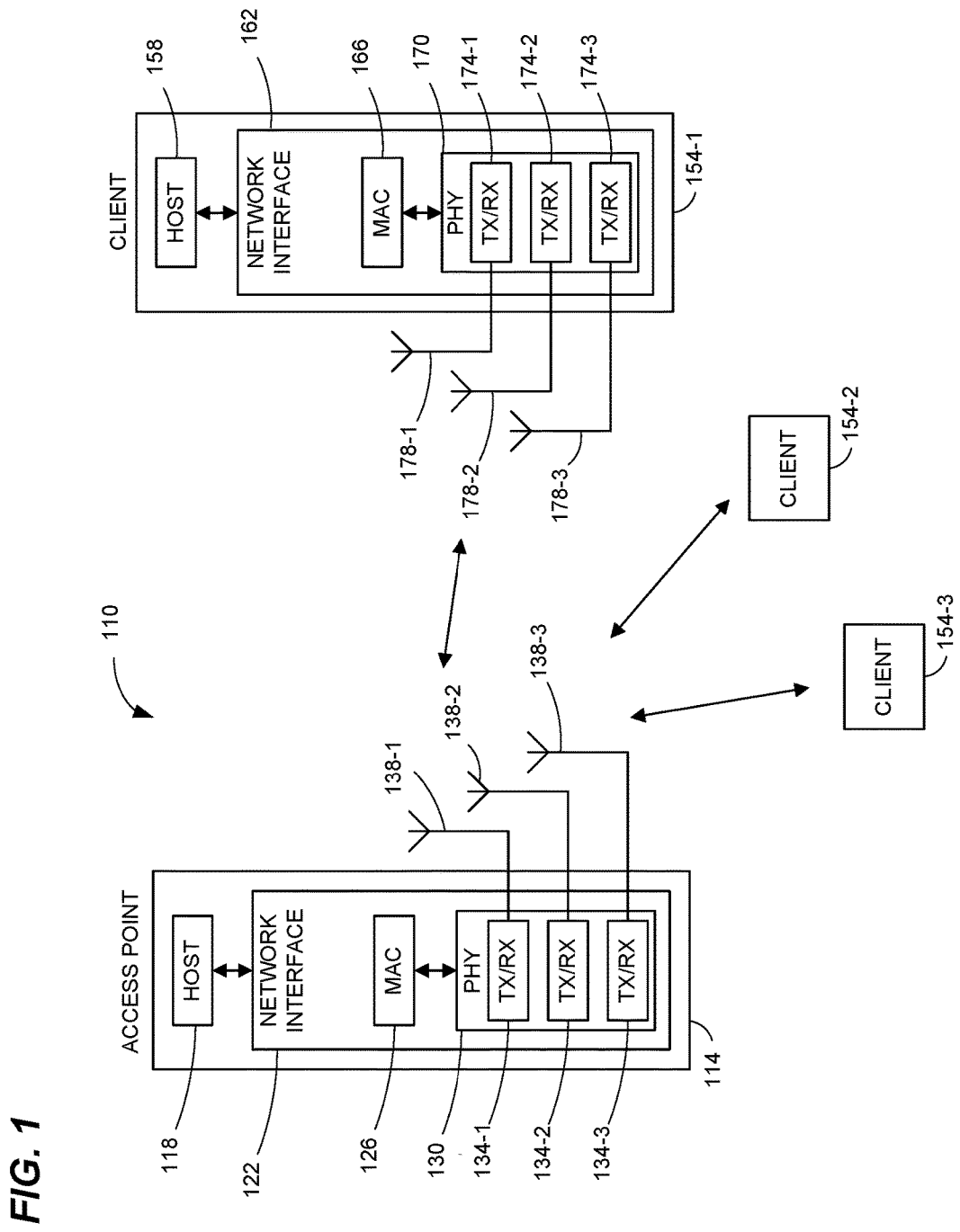
FIG. 1 is a block diagram of an example wireless local area network (WLAN), according to an embodiment.

FIG. 1 is a block diagram of an example WLAN 110, according to an embodiment. The WLAN 110 supports downlink (DL) and uplink (UL) single-user (SU) communication between an access point (AP) and each of a plurality of client stations. In an embodiment, the WLAN 110 also supports DL and UL multi-user (MU) communication between the AP and at least some of the client stations. In some embodiments, the MU communications utilize i) orthogonal frequency division multiple access (OFDMA) techniques, and/or ii) MU multiple-input and multiple-output (MU MIMO).

The WLAN 110 includes an AP 114 that comprises a host processor 118 coupled to a network interface device 122. The network interface 122 includes a medium access control layer (MAC) processor 126 and a physical layer (PHY) processor 130. The PHY processor 130 includes a plurality of transceivers 134, and the transceivers 134 are coupled to a plurality of antennas 138. Although three transceivers 134 and three antennas 138 are illustrated in FIG. 1, the AP 114 includes other suitable numbers (e.g., 1, 2, 4, 5, etc.) of transceivers 134 and antennas 138 in other embodiments. In some embodiments, the AP 114 includes a higher number of antennas 138 than transceivers 134, and antenna switching techniques are utilized. The PHY processor 130 includes circuitry, coupled to the antennas 138, that is configured to upconvert baseband signals to radio frequency (RF) signals for transmission via the antennas 138. The PHY processor 130 also includes circuitry, coupled to the antennas 138, that is configured to downconvert RF signals received via the antennas 138 to baseband signals. Such upconvert and downconvert circuitry may be included, at least partially, in the transceivers 134, in some embodiments.

The network interface 122 is implemented using one or more integrate circuits (ICs) configured to operate as discussed below. For example, the MAC processor 126 may be implemented, at least partially, on a first IC, and the PHY processor 130 may be implemented, at least partially, on a second IC. As another example, at least a portion of the MAC processor 126 and at least a portion of the PHY processor 130 may be implemented on a single IC. For instance, the network interface 122 may be implemented using a system on a chip (SoC), where the SoC includes at least a portion of the MAC processor 126 and at least a portion of the PHY processor 130.

In various embodiments, the MAC processor 126 and/or the PHY processor 130 of the AP 114 are configured to generate data units, and process received data units, that conform to a WLAN communication protocol such as a communication protocol conforming to the IEEE 802.11 Standard (e.g., in its current form or as amended in the future) or another suitable wireless communication protocol. For example, the MAC processor 126 may be configured to implement MAC layer functions, including MAC layer functions of the WLAN communication protocol, and the PHY processor 130 may be configured to implement PHY functions, including PHY functions of the WLAN communication protocol. For instance, the MAC processor 126 may be configured to generate MAC layer data units such as MAC service data units (MSDUs), MAC protocol data units (MPDUs), etc., and provide the MAC layer data units to the PHY processor 130. The PHY processor 130 may be configured to receive MAC layer data units from the MAC processor 126 and encapsulate the MAC layer data units to generate PHY data units such as PHY protocol data units (PPDUs) for transmission via the antennas 138. The PHY processor 130 may be configured to cause the AP 114 to transmit a signal by providing a baseband signal that includes a PPDU to the circuitry configured to upconvert baseband signals to RF signals. The circuitry configured to upconvert baseband signals to RF signals responsively provides the RF signal that includes the PPDU to the antennas 138.

Similarly, the PHY processor 130 may be configured to receive PHY data units that were received via the antennas 138, and extract MAC layer data units encapsulated within the PHY data units. For example, the circuitry configured to downconvert RF signals to baseband signals may output a baseband signal that includes a received PPDU, and the PHY processor 130 may extract one or more MAC layer data units encapsulated in the PPDU. The PHY processor 130 may provide the extracted MAC layer data units to the MAC processor 126, which processes the MAC layer data units.

The WLAN 110 includes a plurality of client stations 154. Although three client stations 154 are illustrated in FIG. 1, the WLAN 110 includes other suitable numbers (e.g., 1, 2, 4, 5, 6, etc.) of client stations 154 in various embodiments. The client station 154-1 includes a host processor 158 coupled to a network interface device 162. The network interface 162 includes a MAC processor 166 and a PHY processor 170. The PHY processor 170 includes a plurality of transceivers 174, and the transceivers 174 are coupled to a plurality of antennas 178. Although three transceivers 174 and three antennas 178 are illustrated in FIG. 1, the client station 154-1 includes other suitable numbers (e.g., 1, 2, 4, 5, etc.) of transceivers 174 and antennas 178 in other embodiments. In some embodiments, the client station 154-1 includes a higher number of antennas 178 than transceivers 174, and antenna switching techniques are utilized. The PHY processor 170 includes circuitry, coupled to the antennas 178, that is configured to upconvert baseband signals to RF signals for transmission via the antennas 178. The PHY processor 170 also includes circuitry, coupled to the antennas 178, that is configured to downconvert RF signals received via the antennas 178 to baseband signals. Such upconvert and downconvert circuitry may be included, at least partially, in the transceivers 174, in some embodiments.

The network interface 162 is implemented using one or more ICs configured to operate as discussed below. For example, the MAC processor 166 may be implemented on at least a first IC, and the PHY processor 170 may be implemented on at least a second IC. As another example, at least a portion of the MAC processor 166 and at least a portion of the PHY processor 170 may be implemented on a single IC. For instance, the network interface 162 may be implemented using an SoC, where the SoC includes at least a portion of the MAC processor 166 and at least a portion of the PHY processor 170.

In various embodiments, the MAC processor 166 and the PHY processor 170 of the client device 154-1 are configured to generate data units, and process received data units, that conform to the WLAN communication protocol (e.g., in its current form or as amended in the future) or another suitable communication protocol. For example, the MAC processor 166 may be configured to implement MAC layer functions, including MAC layer functions of the WLAN communication protocol, and the PHY processor 170 may be configured to implement PHY functions, including PHY functions of the WLAN communication protocol. The MAC processor 166 may be configured to generate MAC layer data units such as MSDUs, MPDUs, etc., and provide the MAC layer data units to the PHY processor 170. The PHY processor 170 may be configured to receive MAC layer data units from the MAC processor 166 and encapsulate the MAC layer data units to generate PHY data units such as PPDUs for transmission via the antennas 178. The PHY processor 170 may be configured to cause the client station 154-1 to transmit a signal by providing a baseband signal that includes a PPDU to the circuitry configured to upconvert baseband signals to RF signals. The circuitry configured to upconvert baseband signals to RF signals responsively provides the RF signal that includes the PPDU to the antennas 178.

Similarly, the PHY processor 170 may be configured to receive PHY data units that were received via the antennas 178, and extract MAC layer data units encapsulated within the PHY data units. For example, the circuitry configured to downconvert RF signals to baseband signals may output a baseband signal that includes a received PPDU, and the PHY processor 170 may extract one or more MAC layer data units encapsulated in the PPDU. The PHY processor 170 may provide the extracted MAC layer data units to the MAC processor 166, which processes the MAC layer data units.

In an embodiment, each of the client stations 154-2 and 154-3 has a structure that is the same as or similar to the client station 154-1. Each of the client stations 154-2 and 154-3 has the same or a different number of transceivers and antennas. For example, the client station 154-2 and/or the client station 154-3 each have only two transceivers and two antennas (not shown), according to an embodiment.

Figure 2A:
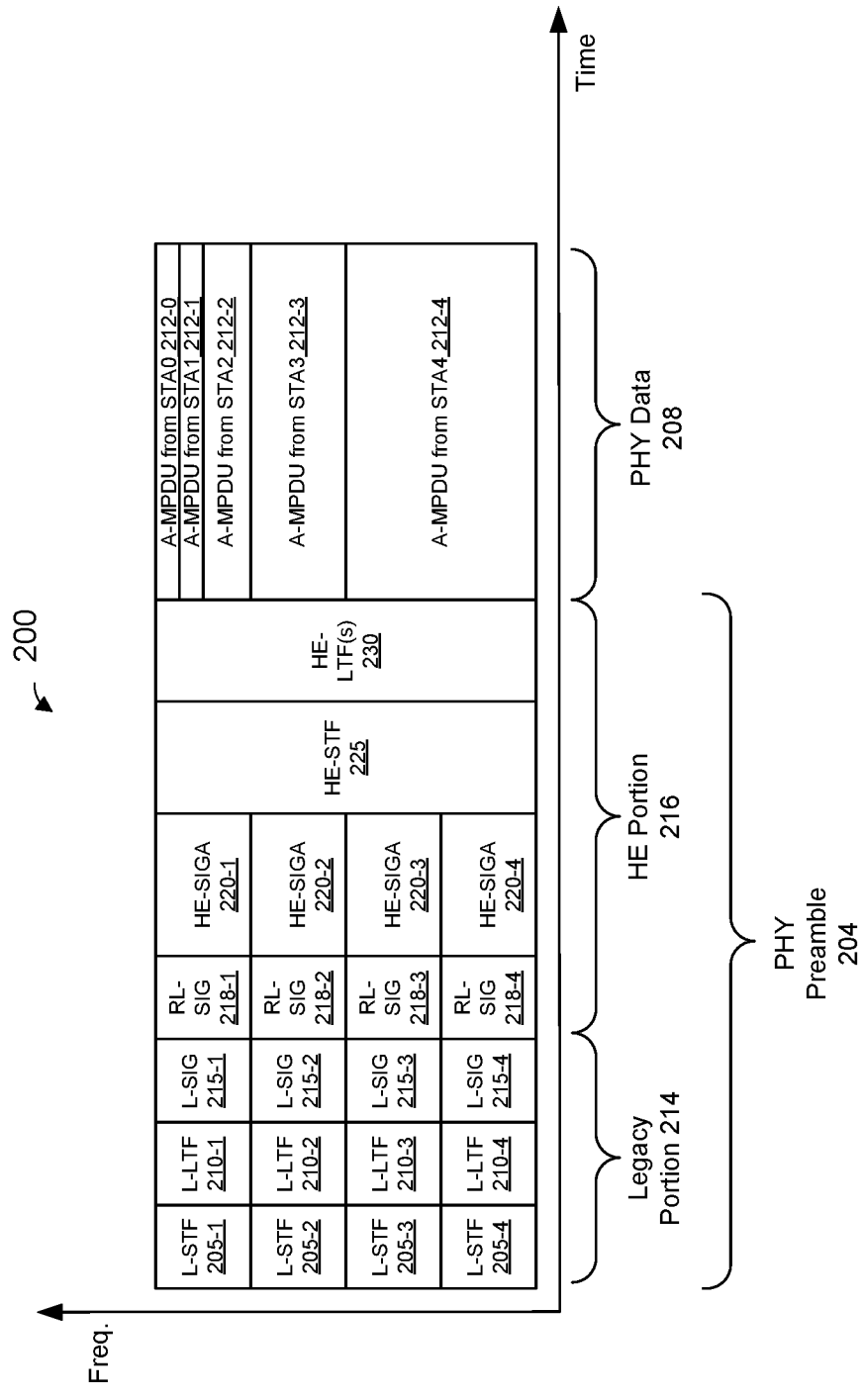
FIG. 2A is a block diagram of an example physical layer (PHY) data unit corresponding to an uplink multi-user (UL MU) transmission, according to an embodiment.

FIG. 2A is a diagram of an UL MU PHY data unit 200 that the network interfaces 162 (FIG. 1) of multiple client stations 154 are configured to, collectively, generate and transmit to the AP 1144, according to an embodiment. The PHY data unit 200 may occupy a 20 MHz bandwidth or another suitable bandwidth. Data units similar to the data unit 200 occupy other suitable bandwidth such as 40 MHz, 80 MHz, 160 MHz, 320 MHz, 640 MHz, etc., in other embodiments.

The PHY data unit 200 includes a PHY preamble 204 and a PHY data portion 208. The PHY preamble 204 includes a legacy portion 214 and a high efficiency WiFi (HE) portion 216.

The legacy portion 214 includes legacy short training fields (L-STFs) 205, legacy long training fields (L-LTFs) 210, and legacy signal fields (L-SIGs) 215. The HE portion 216 includes repeated L-SIGs (RL-SIGs) 218, HE signal fields (HE-SIGAs) 220, an HE short training field (HE-STF) 225, one or more HE long training fields (HE-LTF(s)) 230. Each of the L-STF 205, the L-LTF 210, and the L-SIG 215, the RL-SIG 218, HE-SIG-A 220, the HE-STF 225, and the M HE-LTFs 230 comprises one or more orthogonal frequency division multiplexing (OFDM) symbols.

In the embodiment of FIG. 2, the PHY data unit 200 includes one of each of the L-STF 205, the L-LTF 210, the L-SIG 215, RL-SIG 218 the HE-SIG-A 220, in each of a plurality of component channels. In an embodiment, each component channel occupies a bandwidth of 20 MHz. In other embodiments, each component channel occupies another suitable bandwidth (e.g., 1 MHz, 2 MHz, 5 MHz, 10 MHz, etc.). In an embodiment, the PHY data unit 200 occupies a cumulative bandwidth of 80 MHz. In other embodiments in which a data unit similar to the PHY data unit 200 occupies a another suitable cumulative bandwidth other than 80 MHz (e.g., 4 MHz, 8 MHz, 20 MHz, 40 MHz, 160 MHz, 320 MHz, etc.), each of the L-STF 205, the L-LTF 210, the L-SIG 215, the RL-SIG 218, and HE-SIG-A 220 is repeated over a corresponding number of 20 MHz sub-bands of the whole bandwidth of the data unit, in an embodiment.

More specifically, in an embodiment, each HE-SIG-A 220 spans an individual component channel and is duplicated in other individual component channels. For example, in an embodiment, each HE-SIGA 220 spans an individual 20 MHz component channel and is duplicated in other individual 20 MHz component channels. In other embodiments, respective HE-SIGAs 220 in respective individual channels are not duplicates but rather may include different information.

In other embodiments, the PHY data unit 200 occupies a bandwidth equal to a single component channel bandwidth (e.g., 20 MHz) and includes one of each of the L-STF 205, the L-LTF 210, the L-SIG 215, RL-SIG 218 the HE-SIG-A 220, and HE-SIG-B 222.

In an embodiment, the HE-SIG-A 220 generally carries information about the format of the PHY data unit 200. In some embodiments, HE-SIG-A 220 additionally includes information for client stations 25 that are not intended receivers of the PHY data unit 200, such as information needed for medium protection from the client stations 154 that are not receivers of the PHY data unit 200.

Each of the HE-STF 225 and the HE-LTF(s) 230 span the composite communication channel, in an embodiment.

In some embodiments and/or scenarios, the preamble 204 omits one or more of the fields 205-230. In some embodiments, the preamble 204 includes additional fields not illustrated in FIG. 2.

The PHY data portion 208 of the PHY data unit 200 includes a plurality of aggregated MAC protocol data units (A-MPDUs) 212 respectively transmitted by ones of multiple client stations 154 in an UL MU transmission. Each A-MPDUs 212 may occupy a sub-channel that spans a bandwidth smaller than a component channel bandwidth, may span a bandwidth of a component channel, and/or may span a bandwidth greater than the bandwidth of a component channel.

Figure 2B:
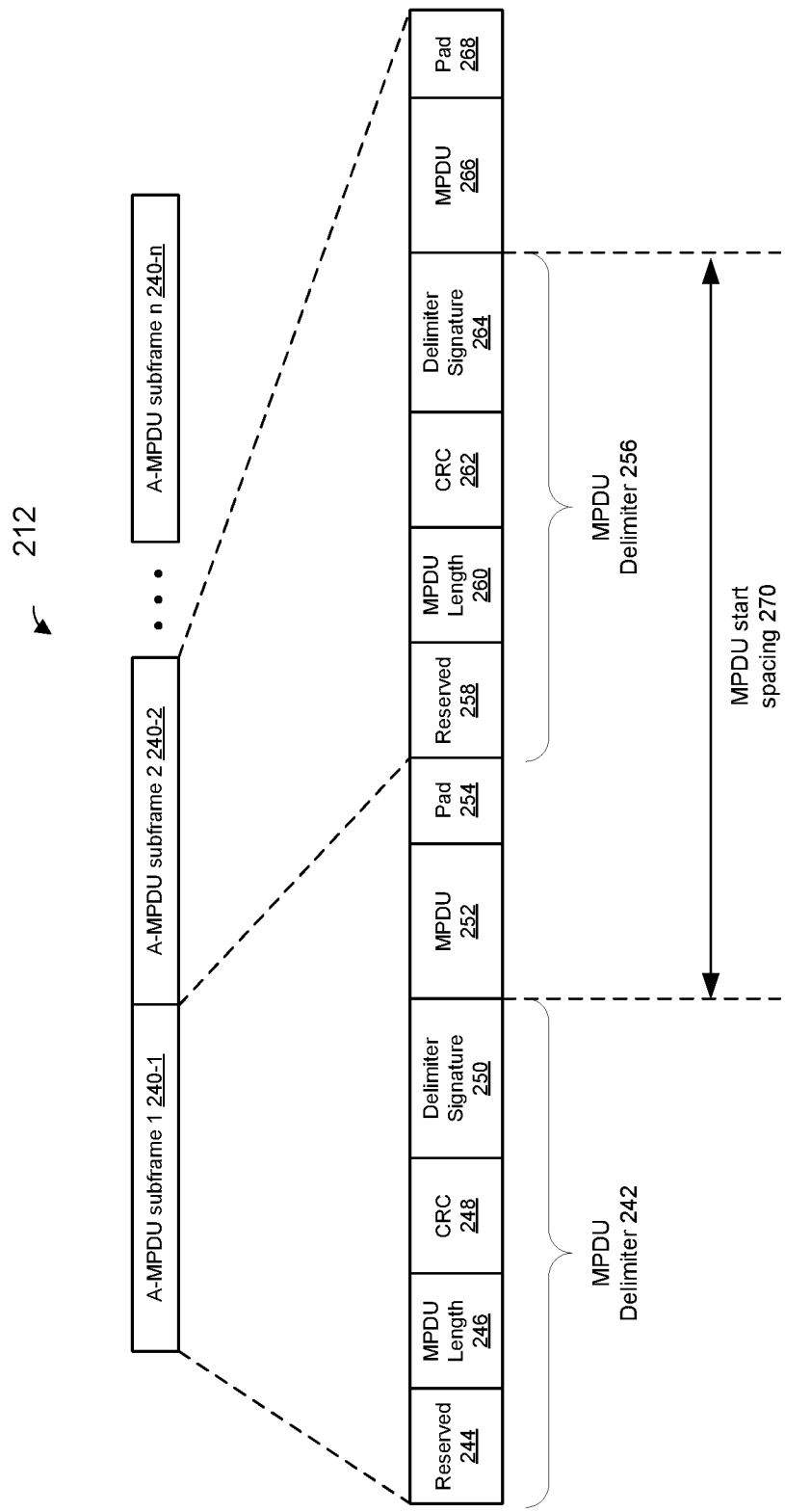
FIG. 2B is a block diagram of an example aggregated medium access control (MAC) protocol data unit (A-MPDU), according to an embodiment.

FIG. 2B is a diagram of an A-MPDU 212 as utilized in a PHY data unit 200, according to an embodiment. A-MPDU 212 includes multiple A-MPDU subframes 240. A-MPDU subframe 240-1 includes an MPDU delimiter 242, MPDU 252, and padding 254. The MPDU delimiter 242 includes a reserved field 244, an MPDU length field 246, a cyclic redundancy check (CRC) field 248, a delimiter signature field 250. MPDU length 246 indicates a length of the MPDU 252. Delimiter signature field 250 includes a unique data pattern that is used to detect the MPDU delimiter 242. A-MPDU subframe 240-2 similarly includes an MPDU delimiter 256, MPDU 266, and padding 268. The start of MPDU 252 and the start of MPDU 264 in the consecutive A-MPDU subframes 240-1 and 240-2 are separated by a time equal to an MPDU start spacing 270.

Figure 3:
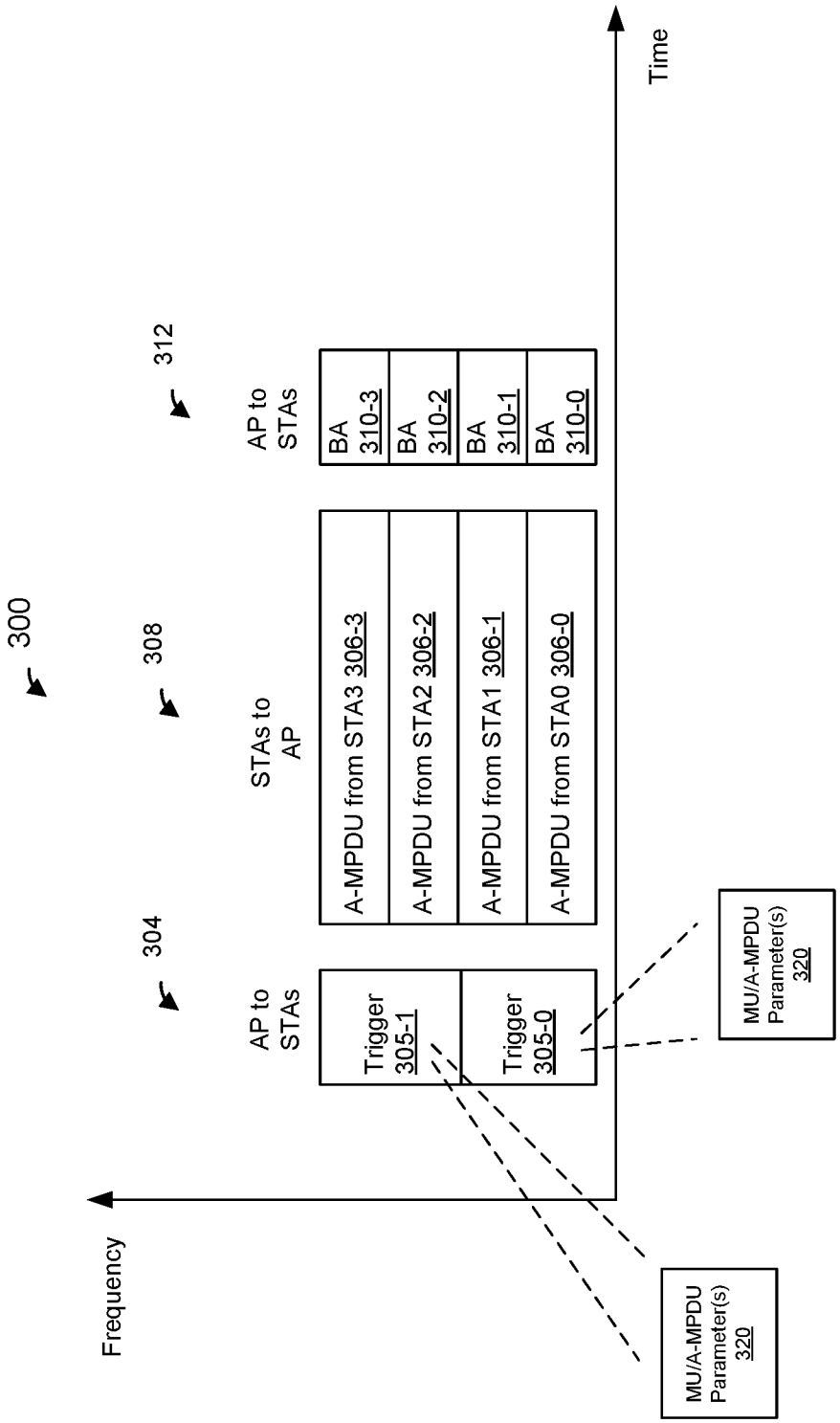
FIG. 3 is a diagram of an example frame exchange corresponding to an UL MU transmission, according to an embodiment.

In an embodiment, an UL MU PHY data unit is transmitted from multiple client stations 154 in response to a trigger frame transmitted by the AP 114. FIG. 3 is a diagram of an example transmission sequence 300 including trigger frames within a DL PHY data unit 304 followed by an UL MY PHY transmission 308, according to an embodiment. In an embodiment, the DL PHY data unit 304 comprises one or more trigger frames 305 that provide, to the plurality of client stations 154, resource unit allocation information and/or other transmission parameters corresponding to the subsequent UL MU PHY transmission 308. In various embodiments, the DL PHY data unit corresponds to i) a non-HT (duplicate) PPDU, ii) a DL SU PPDU (e.g., an HT SU PPDU, a VHT SU PPDU, an HE SU PPDU, etc.), iii) an HE MU PPDU, etc.

In response to the DL PHY data unit 304, each client station 154 participating in the UL MU transmission begins transmitting as part of the UL MU PHY data transmission 308. In an embodiment, transmission of the UL MU PHY transmission 308 begins upon expiration of a suitable predetermined time interval (e.g., a short inter-frame space (SIFS)) after completion of reception of the DL PHY data unit 304 at the client stations 154. In another embodiment, a suitable predetermined time period other than SIFS is utilized.

The client stations 154 (STA0-STA3) each transmit as part of the UL MU PHY data unit 308, wherein the UL MU PHY transmission 308 includes A-MPDUs 306 from respective stations 154. In an embodiment, each client station transmits a respective A-MPDU 306 using transmission parameters, such as a modulation and coding scheme, a coding type, transmission power, length or duration of the data unit, etc., indicated in one or more of the trigger flames 305. In another embodiment, at least some of the client stations transmit A-MPDUs 306 using at least some transmission parameters, such as a modulation and coding scheme, a coding type, transmission power, length or duration of the data unit, etc., determined by the client stations and not indicated in the trigger frames 305.

Next, the AP transmits a DL MU PHY data unit 312, according to an embodiment. In an embodiment, the PHY data unit 312 includes respective block acknowledgement (BA) frames 310 to the client stations 154 (STA0 through STA3), acknowledging receipt of the A-MPDUs 306 from the client stations 154. In another embodiment, the transmission 312 is a single user (SU) or broadcast transmission duplicated in multiple subchannels (e.g., component channels).

While FIG. 3 shows an example transmission sequence involving four client stations 154 (STA0-STA3), in other embodiments, a different number of client stations (e.g., 2, 3, 5, 6, etc.) are involved.

As discussed above, the AP transmits one or more A-MPDU-related parameters to the client stations to indicate certain limits on how A-MPDUs can be generated by the client stations to help ensure that the AP can properly process A-MPDU from the client stations. For example, the AP may transmit one or both of i) a parameter that specifies a minimum spacing between the starts of two adjacent MPDUs, and ii) a parameter that specifies a maximum length of an A-MPDU. The AP may transmit such parameters in a beacon frame, a probe response frame, an association response frame, a reassociation response frame, etc., or another suitable frame. Each such frame is included in a PHY data unit and transmitted by the AP to one or more client stations.

Such A-MPDU-related parameters, however, may not have a consistent effect for both SU PHY data units and MU PHY data units. For example, in the UL MU PHY transmission 308, each A-MPDU 306 may individually conform to a minimum spacing between the starts of two adjacent MPDUs, but when the UL MU PHY transmission 308 is considered as a whole, the minimum spacing between the starts of two adjacent MPDUs is not satisfied. As another example, each A-MPDU 306 may individually conform to a maximum A-MPDU length, but when the UL MU PHY transmission 308 is considered as a whole, the maximum A-MPDU length is not satisfied.

Thus, in some embodiments, the AP transmits additional MU-related A-MPDU parameters to the client stations so that the client stations can determine limits on how A-MPDUs for MU PHY transmissions can be generated by the client station to help ensure that the AP can properly process A-MPDUs included in MU PHY transmissions from the client stations.

For example, the trigger frames 305 each include one or more MU-related parameters 320 that facilitate the client stations determining limits on how A-MPDUs can be generated by the client station to help ensure that the AP can properly process A-MPDUs included in MU PHY transmissions 308. In some embodiments, the one or more MU-related parameters 320 includes a parameter related to a minimum spacing between the starts of two adjacent MPDUs for MU PHY transmissions. For example, the parameter 320 can be used by the station to modify the IEEE 802.11 Standard-specified Minimum MPDU Start Spacing parameter, to arrive at a modified minimum MPDU start spacing that is relevant for the MU PHY transmission 308. Such a parameter is referred to herein as a "Density MU Relax" parameter. In an embodiment, a client station can determine a modified minimum MPDU start spacing that is relevant for the MU PHY transmission 308 according to:

$$\text{Modified Minimum MPDU Start Spacing} = \text{Minimum MPDU Start Spacing parameter} * \text{Density MU Relax} \qquad \text{Equation 1}$$

In an embodiment, the Density MU Relax parameter is determined by the AP based on a number of client stations scheduled to participate in the UL MU PHY transmission 308 and, optionally, other information associated with the UL MU transmissions (e.g., one or more of bandwidths of RUs assigned to client stations, the MCSs of client stations, etc.). For example, the Density MU Relax parameter is determined to be a suitable value greater than or equal to one, and less than or equal to the number of client stations scheduled to participate in the UL MU PHY transmission 308. In an embodiment, the Density MU Relax parameter is set to the number of client stations scheduled to participate in the UL MU PHY transmission 308. In another embodiment, the Density MU Relax parameter is set to the number of client stations multiplied by a factor which is less than one. In yet another embodiment, the Density MU Relax parameter is set to the number of client stations multiplied by a factor which is greater than one. In still another embodiment, the Density MU Relax parameter is determined based on i) the number of client stations, and ii) one or both of a) the bandwidths of RUs assigned to client stations, and b) MCSs of client stations.

In another embodiment, the parameter 320 is a parameter indicating a number of stations scheduled to participate in the UL MU PHY transmission 308. Such a parameter is referred to herein as a "Number of STAs" parameter. The Number of STAs parameter can be used by the station to modify the IEEE 802.11 Standard-specified Minimum MPDU Start Spacing parameter, to arrive at a modified minimum MPDU start spacing that is relevant for the MU PHY transmission 308. In an embodiment, a client station can determine a modified minimum MPDU start spacing that is relevant for the MU PHY transmission 308 according to:

$$\text{Modified Minimum MPDU Start Spacing} = \text{Minimum MPDU Start Spacing parameter} * \text{Number of STAs} \qquad \text{Equation 2}$$

In another embodiment, the parameter 320 is an MU-specific parameter specifying a minimum MPDU start spacing for the MU PHY transmission 308 specifically, or MU PHY transmissions generally. Such a parameter is referred to herein as an "MU Minimum MPDU Start Spacing" parameter.

In some embodiments, the one or more MU-related parameters 320 include a parameter related to a maximum A-MPDU length for MU PHY transmissions. For example, the parameter 320 can be used by the station to modify the maximum A-MPDU length determined according to the IEEE 802.11 Standard-specified Maximum A-MPDU Length Exponent parameter, to arrive at a modified maximum A-MPDU length that is relevant for the MU PHY transmission 308. Such a parameter is referred to herein as a "Length MU Relax" parameter. In an embodiment, a client station can determine a modified maximum A-MPDU length that is relevant for the MU PHY transmission 308 according to:

$$\text{Modified Maximum A-MPDU Length} = \text{maximum A-MPDU length(determined according to Maximum A-MPDU Length Exponent)} / \text{Length MU Relax} \qquad \text{Equation 3}$$

In an embodiment, the Length MU Relax parameter is determined by the AP based on a number of client stations scheduled to participate in the UL MU PHY transmission 308 and, optionally, other information associated with the UL MU transmissions (e.g., one or more of bandwidths of RUs assigned to client stations, the MCSs of client stations, etc.). For example, the Length MU Relax parameter is determined to be a suitable value greater than or equal to one, and less than or equal to the number of client stations scheduled to participate in the UL MU PHY transmission 308. In an embodiment, the Length MU Relax parameter is set to the number of client stations scheduled to participate in the UL MU PHY transmission 308. In another embodiment, the Length MU Relax parameter is set to the number of client stations multiplied by a factor which is less than one. In yet another embodiment, the Length MU Relax parameter is set to the number of client stations multiplied by a factor which is greater than one. In still another embodiment, the Length MU Relax parameter is determined based on i) the number of client stations, and ii) one or both of a) the bandwidths of RUs assigned to client stations, and b) MCSs of client stations.

In another embodiment, a client station can determine a modified maximum A-MPDU length that is relevant for the MU PHY transmission 308 according to:

$$\text{Modified Maximum A-MPDU Length} = \text{maximum A-MPDU length(determined according to Maximum A-MPDU Length Exponent)} * \text{Length MU Relax'} \qquad \text{Equation 4}$$

where the Length MU Relax' parameter is determined by the AP based on a number of client stations scheduled to participate in the UL MU PHY transmission 308. For example, the Length MU Relax' parameter is determined to be a suitable value less than or equal to one, and greater than or equal to the inverse of the number of client stations scheduled to participate in the UL MU PHY transmission 308. In an embodiment, the Length MU Relax' parameter is set to the inverse of the number of client stations scheduled to participate in the UL MU PHY transmission 308 and, optionally, other information associated with the UL MU transmissions (e.g., one or more of bandwidths of RUs assigned to client stations, the MCSs of client stations, etc.). In another embodiment, the Length MU Relax' parameter is set to the number of client stations multiplied by a factor which is less than one. In yet another embodiment, the Length MU Relax' parameter is set to the number of client stations multiplied by a factor which is greater than one. In still another embodiment, the Length MU Relax' parameter is determined based on i) the number of client stations, and ii) one or both of a) the bandwidths of RUs assigned to client stations, and b) MCSs of client stations.

If the parameter 320 is the Number of STAs parameter, the station can use the Number of STAs parameter to modify a maximum A-MPDU length determined according to the IEEE 802.11 Standard-specified Maximum A-MPDU Length Exponent parameter, to arrive at a modified maximum A-MPDU length that is relevant for the MU PHY transmission 308. In an embodiment, a client station can determine a modified maximum A-MPDU length that is relevant for the MU PHY transmission 308 according to:

$$\text{Modified Maximum A-MPDU Length} = \text{maximum A-MPDU length(determined according to Maximum A-MPDU Length Exponent)} / \text{Number of STAs} \qquad \text{Equation 5}$$

In another embodiment, the parameter 320 is an MU-specific parameter specifying a maximum A-MPDU length, (or a Maximum A-MPDU Length Exponent parameter) for the MU PHY transmission 308 specifically, or MU PHY transmissions generally. Such a parameter is referred to herein as an "MU Maximum A-MPDU Length" parameter.

In some embodiments, each trigger frame 305 includes multiple parameters 320 such as discussed above. For example, each trigger frame 305 may include two or more of i) the Density MU Relax parameter, ii) the MU Minimum MPDU Start Spacing parameter, iii) the Length MU Relax parameter, iv) the MU Maximum A-MPDU Length parameter, v) the Number of STAs parameter, etc.

Figure 4:
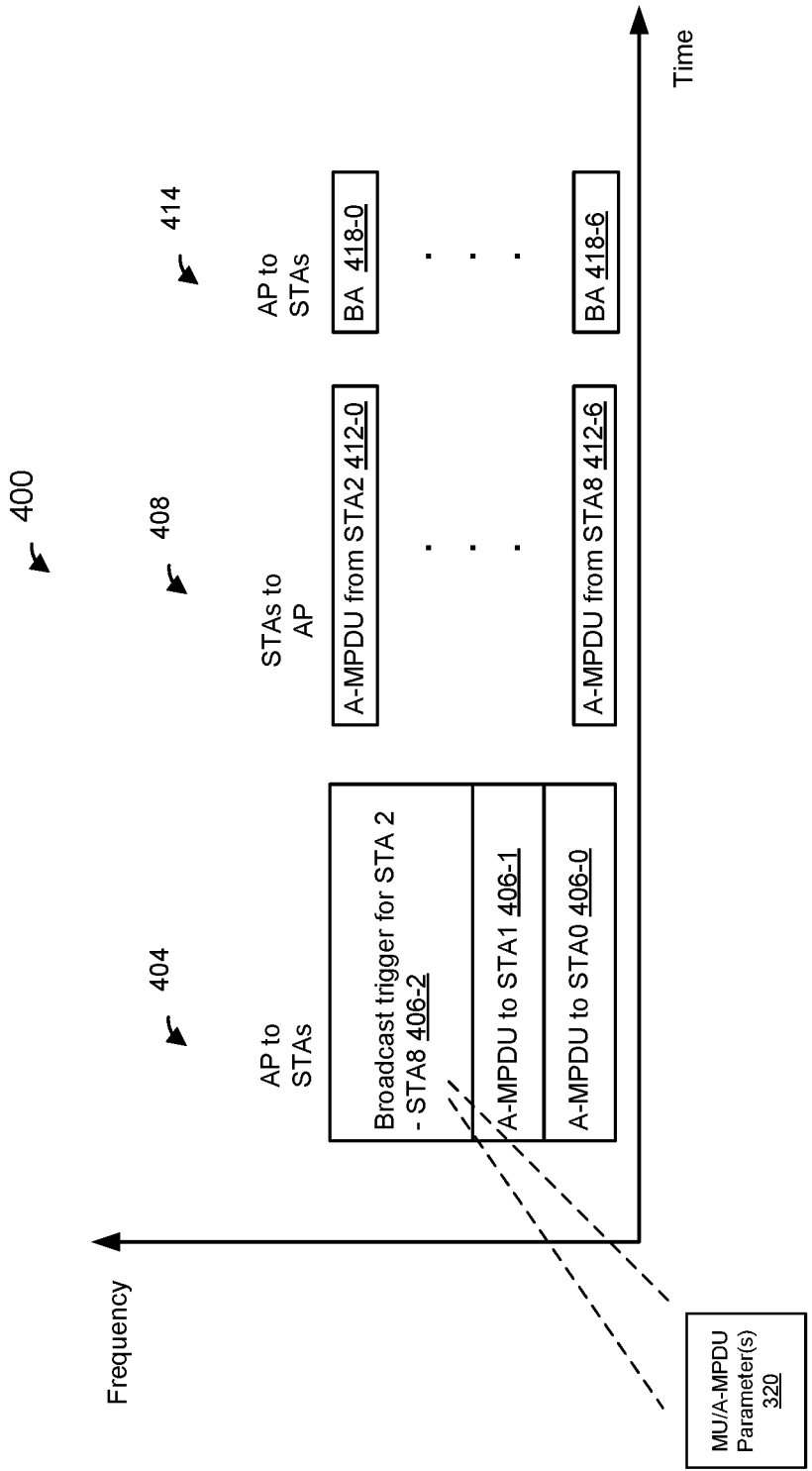
FIG. 4 is a diagram of another example frame exchange corresponding to an UL MU transmission, according to an embodiment.

In an embodiment, one or more trigger frames from an AP are included in a DL MU transmission from the AP 114, which also includes one or more A-MPDUs directed towards one or more of client stations 154. FIG. 4 is a diagram of a transmission sequence 400 in a WLAN, according to an embodiment. In the example illustrated in FIG. 4, an AP triggers an UL MU transmission from multiple client stations. In particular, the AP 114 transmits a DL OFDMA transmission 404 to a plurality of client stations 154. The DL OFDMA transmission 404 includes A-MPDUs (e.g., A-MPDU 406-0, A-MPDU 406-1) directed to one or more of the client stations 154 (e.g., STA0, STA1). The DL MU transmission 404 also includes a broadcast trigger frame 406-2. The broadcast trigger frame 406-2 provides, to client stations STA2-STA8, resource unit allocation information and/or other transmission parameters corresponding to a subsequent uplink MU transmission. The trigger frame 406-2 includes one or more parameters 320 discussed above.

In other embodiments, instead of the broadcast trigger frame 406-2, the DL MU transmission 404 includes unicast trigger frames addressed to at least some of the client stations 154 (e.g., STA2-STA8). For example, in an embodiment, the DL MU transmission 404 includes multiple unicast trigger frames, each directed to one respective client station of the multiple client stations 154.

In response to the DL MU transmission 404, multiple client stations 154 (STA2-STA8) transmit as part of an UL OFDMA transmission 408, wherein the UL OFDMA transmission 408 includes A-MPDUs 412 from respective stations 154. The client stations 154 (STA2-STA8) use the parameter(s) 320 to generate the A-MPDUs 412 as discussed above. The AP 114 transmits a DL MU transmission 414, including one or more acknowledgement frames 418 in response to the received UL MU transmission 408.

Figure 5A:
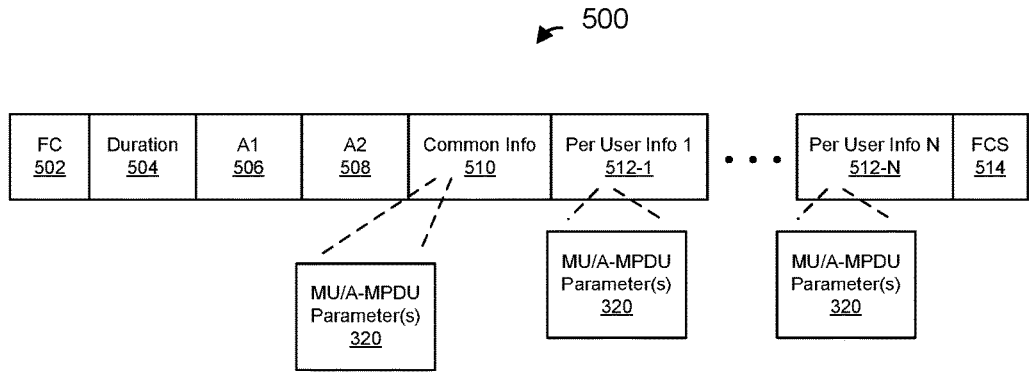
FIG. 5A is a block diagram of an example trigger frame, according to an embodiment.

FIG. 5A is a block diagram of an example trigger frame 500 that may be used to prompt an UL MU transmission from multiple client stations 154, in an embodiment. Referring to FIGS. 3 and 4, the trigger frame 500 may be included in the DL PHY data unit 304 or the DL PHY data unit 404.

The trigger frame 500 includes a frame control (FC) field 502, a duration field 504, address fields A1 506 and A2 508, common information field 510, N user-specific per user information fields 512-1 to 512-N (where N is an integer corresponding to a number of client stations scheduled to participate in an UL MU transmission), and a frame check sequence (FCS) field 514. The FC field 502 indicates that the frame 500 is a trigger frame. The FC field 502 is also used to indicate a version of the communication protocol being used. In an embodiment, the duration field 504 indicates duration of one or more frames (e.g., the trigger frame and, optionally, a frame following the trigger frame 500). The address fields A1 506 and A2 508 indicate receiver address and transmitter address, respectively. For instance, field A1 506 indicates an address of a client station 154, or a group of client stations 154, receiving the trigger frame, or A1 is set to a broadcast address indicating that the frame is not addressed to a specific client station or a specific group of client stations. In an embodiment, field A1 506 is omitted from the trigger frame. Field A2 508 indicates an address of an AP 114 that transmits the trigger frame 500. Common information field 510 includes information that is common for multiple client stations 154. One or more per user information fields 512 are used to transmit user-specific information to client stations 154. For instance, in an embodiment, per-user information 1 field 512-1 is used to transmit information specific to client station 154-1, whereas per-user information 1 field 512-2 (not shown) is used to transmit information specific to client station 154-2. The FCS field 514 indicates a result of a CRC calculation to be used for error detection at a receiver.

In an embodiment, one or more of the parameters 320 are included in the common information field 510. In another embodiment, one or more of the parameters 320 are included in each per-user information field 512. In another embodiment, one or more of the parameters 320 are included in the common information field 510 and in each per-user information field 512.

Figure 5B:
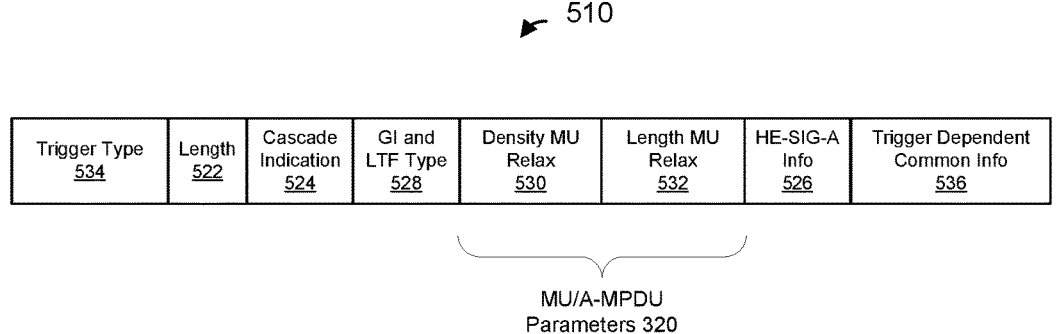
FIG. 5B is a block diagram of an example common information field of a trigger frame, according to an embodiment.

FIG. 5B is a block diagram of a common information field 510 as included in a trigger frame, such as the trigger frame 500, according to an embodiment. The common information field 510 includes information that is common for a multiple client stations 154 responding to the trigger frame 500. The common information field 510 includes a length subfield 522, a cascade indication subfield 524, an HE-SIG-A information subfield 526, a guard interval (GI) and LTF type subfield 528, a density MU relax subfield 530, a length MU relax subfield 532, a trigger type subfield 534, and a trigger dependent common information subfield 536. In various embodiments, on or more of the above subfields are omitted from the common information field 510. For example, in an embodiment, the length MU relax subfield 532 is omitted from the common information field 510. In some embodiments, other subfields are included in the common information field 510. Additionally, the order of subfields in the common information field 510 may be different than illustrated in FIG. 5B, in other embodiments.

The length subfield 522 indicates a length of a subsequent UL transmission that is responsive to the trigger frame 500. The cascade indication subfield 524 indicates whether a subsequent trigger frame follows the trigger frame 500. The HE-SIG-A information subfield 526 indicates indicate values of reserved bits in an HE-SIG-A2 of the subsequent UL transmission that is responsive to the trigger frame 500. The GI and LTF type subfield indicates a GI and an HE-LTF type of the subsequent UL transmission that is responsive to the trigger frame 500. The Density MU Relax subfield 530 and the Length MU Relax subfield 532 include the Density MU Relax parameter and the Length MU Relax parameter, respectively, as discussed above. The trigger type subfield 534 indicates a type of trigger (e.g., basic trigger, beamforming report poll trigger, etc.) of the trigger frame 500. Trigger dependent common information subfield 536 includes trigger-type specific information. In some types of trigger frames (e.g., basic trigger), the common information subfield 536 is omitted from the common information field 510.

In other embodiments, the common information field 510 includes one or more other parameters 320 instead of, or in addition to, the Density MU Relax parameter and the Length MU Relax parameter.

Figure 5C:
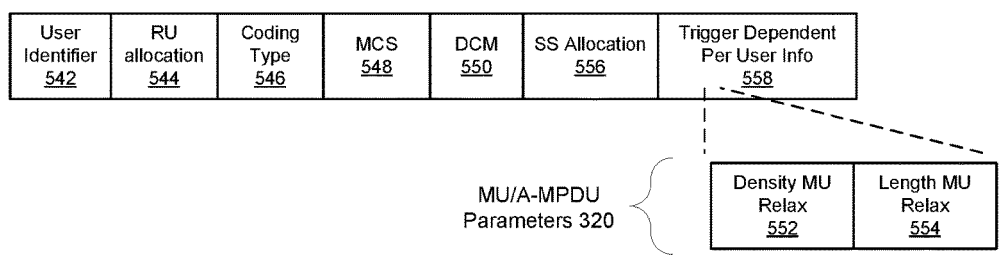
FIG. 5C is a block diagram of an example per-user information field of a trigger frame, according to an embodiment.

FIG. 5C is a block diagram of a per-user information field 512, as included in a trigger frame, such as the trigger frame 500, according to an embodiment. The per-user information field 512 includes information for a specific client station 154 responding to the trigger frame 500. The per-user information field 512 includes a user identifier subfield 542, an RU allocation subfield 544, a coding type subfield 546, a modulation and coding scheme (MCS) subfield 548, a dual carrier modulation (DCM) subfield 550, a density MU relax subfield 552, a length MU relax subfield 554, an spatial streams (SS) allocation subfield 556, and a trigger dependent per use information subfield 558. In some embodiments, other subfields are included in the per-user information field 512. Additionally, the order of subfields in the per-user information field 512 may be different than illustrated in FIG. 5C, in other embodiments.

In an embodiment, the parameter(s) 320 are included in the per-user information field 512 when the parameter(s) 320 are not included in the common information field 510. Similarly, in an embodiment, the parameter(s) 320 are not included in the per-user information field 512 when the parameter(s) 320 are included in the common information field 510. In some embodiments, one or more of the above subfields are omitted from the per-user information field 512. For example, in an embodiment, the Length MU Relax subfield 554 is omitted from the per-user information field 512.

The individual subfields of the per-user information field 512 indicate parameters to be used by a particular client station 154 for the triggered UL MU transmission. The user identifier subfield 542 indicates an association identifier (AID) of the client station 154 for which the per-user information field 512 is intended (e.g., includes a set of least significant bits of the AID (e.g., the least significant 12 bits, or another suitable number of bits). The RU allocation subfield 544 indicates an allocated resource unit (RU) for the client station 154 in which the client station 154 is to transmit as part of the subsequent UL MU transmission responsive to the trigger frame 500. The coding type subfield 546 indicates the code type (e.g., BCC or LDPC) to be used by the client station 154 for the triggered UL MU transmission. The MCS subfield 548 indicates the MCS to be used by the client station 154 for the triggered UL MU transmission. The DCM subfield 550 indicates whether the client station 154 should use dual carrier modulation (DCM) for the triggered UL MU transmission. The SS allocation subfield 556 indicates which spatial streams the client station 154 is to use for the triggered UL transmission. The trigger dependent per-user information 558 includes trigger-type specific information that the client station 154 is to use for the UL MU transmission, such as a traffic ID aggregation limit, an access category (AC) preference level, a preferred AC, etc. In an embodiment, the trigger dependent per-user information 558 includes the Density MU Relax subfield 552 and the Length MU Relax subfield 554, which include the Density MU Relax parameter and the Length MU Relax parameter, respectively, as discussed above. In some embodiments, the Density MU Relax subfield 552 and the Length MU Relax subfield 554 are located elsewhere within the per-user information field 512, e.g., not in the trigger dependent per-user information 558. In an embodiment, the Length MU Relax subfield 554 is omitted from the trigger dependent per-user information 558 and the per-user information field 512.

In other embodiments, the per-user information field 512 includes one or more other parameters 320 instead of, or in addition to, the Density MU Relax parameter and the Length MU Relax parameter.

The AP 114 determines a minimum allowable spacing (e.g., time interval, number of bits, etc.) between consecutive MPDUs in A-MPDUs of an UL OFDMA transmission. In an embodiment, the AP 114 determines the minimum allowable spacing based on the APs capacity to process incoming MPDUs (e.g., number of MPDUs that the AP 114 can process in a given interval of time). In an embodiment, the AP 114 determines the minimum allowable spacing based on the number of client stations 154 transmitting in the UL OFDMA transmission and, optionally, other information associated with the UL MU transmission (e.g., one or more of bandwidths of RUs assigned to client stations, the MCSs of client stations, etc.). Based on the determined minimum allowable spacing, the AP 114 determines the "Density MU Relax" discussed above. The Density MU Relax parameter is useable by a client station 154, responding to the trigger frame, to determine the minimum allowable spacing between consecutive MPDUs in A-MPDUs transmitted by the client station 154.

The client station 154 generates an A-MPDU for an UL MU transmission based on the determined minimum allowable spacing between starts of consecutive MPDUs. For example, the client station 154 generates the A-MPDU in a manner such the spacing between starts of two consecutive MPDUs is not lower than the determined minimum allowable spacing. In an embodiment, a client station 154 ensures that the spacing between the starts of consecutive MPDUs is greater than the determined minimum spacing by inserting additional MPDU delimiters between two MPDUs in consecutive A-MPDU subframes. For instance, in relation to FIG. 2B, if the MPDU start spacing 270 between the A-MPDU subframe 1 240-1 and A-MPDU subframe 2 240-2 is less than the minimum spacing between the starts of consecutive MPDUs as determined above, the client station 154 inserts one or more additional MPDU delimiters between MPDU 252 and MPDU 266.

In some embodiments, the parameter(s) 320 are not included in the trigger frame 305, 406-2, or 500. For instance, a client station 154 may determine or estimate the Number of STAs parameter based on i) the trigger frame 305, 406-2, or 500, and/or a MU downlink/uplink exchange, and then use the determined/estimated Number of STAs parameter to calculate a Modified Minimum MPDU Start Spacing and/or a Modified Maximum A-MPDU Length (e.g., according to Equation 2, Equation 5, or another suitable equation(s)), according to an embodiment. As another example, a client station 154 may determine or estimate the Number of STAs parameter based on i) the trigger frame 305, 406-2, or 500, and/or a MU downlink/uplink exchange, and then use the determined/estimated Number of STAs parameter to calculate a Density MU Relax parameter and/or a Length MU Relax parameter, and then calculate a Modified Minimum MPDU Start Spacing and/or a Modified Maximum A-MPDU Length (e.g., according to Equation 1, Equation 3, Equation 4, or another suitable equation(s)), according to an embodiment.

In an embodiment, a client station 154 may estimate the Number of STAs parameter based on a number of client stations to which a previous DL MU transmission was directed (e.g., assuming that the number of client stations involved in the DL MU transmission is equal to, or approximately equal to, the Number of STAs for the subsequent UL MU transmission). The client station may then use the estimated Number of STAs parameter as discussed above to determine a Modified Minimum MPDU Start Spacing and/or a Modified Maximum A-MPDU Length (e.g., according to one or more of Equations 1-5, or another suitable equation(s)).

Figure 6:
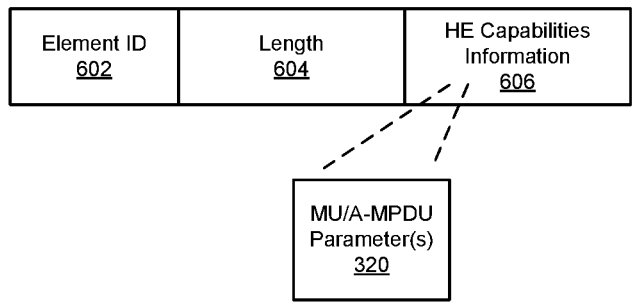
FIG. 6 is a block diagram of an example high-efficiency (HE) capabilities element that may be included in a beacon frame, according to an embodiment.

In some embodiments, the parameter(s) 320 are not included in the trigger frame 305, 406-2, or 500, the parameter(s) 320 are instead included in another type of frame, such as a beacon frame, a probe response frame, an association response frame, a reassociation response frame, etc. FIG. 6 is a block diagram of a high-efficiency (HE) capabilities element 600 that is signaled by the AP 114 in a beacon frame, or an association request/response frame, or a reassociation request/response frame, or a probe request/response frame. The HE capabilities element 600 includes an element ID field 602, a length field 604, an HE capabilities information element field 606.

The element ID field identifies the HE capabilities element 600. The length field 604 specifies the length of the HE capabilities element 600. The HE capabilities information element 606 specifies various capabilities of the AP 114 in relation to the HE communication protocol. In an embodiment, the HE capabilities information element 606 the parameter(s) 320.

Figure 7:
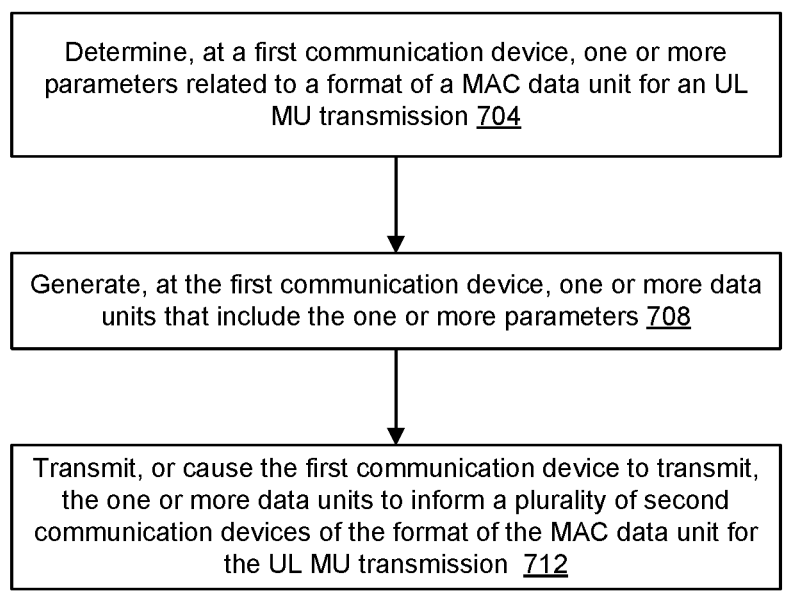
FIG. 7 is a flow diagram of an example method of reporting one or more parameters corresponding to MU media access control layer (MAC) data unit formats to a plurality of communication devices, according to an embodiment.

FIG. 7 is a flow diagram of an example method 700 for reporting one or more parameters corresponding to MU MAC data unit formats to a plurality of communication devices, according to an embodiment. In some embodiments, the AP 114 of FIG. 1 is configured to implement the method 700. The method 700 is described in the context of the AP 114 merely for explanatory purposes and, in other embodiments, the method 700 is implemented by another suitable communication device.

At block 704, a first communication device (e.g., the AP 114) determines one or more parameters related to a format of a MAC data unit for an UL MU transmission. In an embodiment, the format of the MAC data unit for the UL MU transmission is different than a format of a MAC data unit for an UL SU transmission In an embodiment, the one or more parameters include a parameter related to a minimum spacing between two adjacent MPDUs within A-MPDUs for UL MU transmissions. For example, the parameter related to the minimum spacing is a factor to be multiplied with a minimum spacing between two adjacent MPDUs in A-MPDUs for UL SU transmissions to determine the minimum spacing between two adjacent MPDUs in A-MPDUs for UL MU transmissions. As another example, the parameter related to the minimum spacing i) is the minimum spacing between two adjacent MPDUs in A-MPDUs for UL MU transmissions, and ii) is different than a minimum spacing between two adjacent MPDUs A-MPDUs for UL SU transmissions.

In another embodiment, the one or more parameters include a parameter indicating a number of communication devices participating in the UL MU transmission (e.g., Number of STAs), the parameter indicating the number of communication devices is for at least one of: i) adjusting a parameter related to a minimum spacing between two adjacent MAC protocol data units (MPDUs) in aggregated MPDUs (A-MPDUs) for UL SU transmissions to determine a parameter related to a minimum spacing between two adjacent MPDUs in A-MPDUs for UL MU transmissions, and ii) adjusting a parameter related to a maximum length of A-MPDUs for UL SU transmissions to determine a parameter related to a maximum length of A-MPDUs for UL MU transmissions.

In another embodiment, the one or more parameters include a parameter related to a maximum length of A-MPDUs for UL MU transmissions. For example, the parameter related to the maximum length of A-MPDUs for UL MU transmissions is a factor to be multiplied with, or to divide, a maximum length of A-MPDUs for UL SU transmissions to determine the maximum lengths of A-MPDUs for UL MU transmissions. In another example, the parameter related to the maximum length of A-MPDUs for UL MU transmissions is i) the maximum length of A-MPDUs for UL MU transmissions, and ii) different than a maximum length of A-MPDUs for UL SU transmissions.

At block 708, the first communication device generates one or more data units that include the one or more parameters determined at block 704. In an embodiment, the one or more data units include one or more MAC data units, and the MAC processor 126 generates the one or more MAC data units. For example, the MAC processor 126 generates a trigger frame that includes the one or more parameters, where the trigger frame is configured to prompt a plurality of second communication devices (e.g., client stations 154) to transmit as part of an UL MU transmission to the AP 114. As another example, the MAC processor 126 generates one or more of i) a beacon frame, ii) a probe response frame, iii) an association response frame, iv) a reassociation response frame, etc., that include the one or more parameters.

In another embodiment, the one or more data units include one or more PHY data units, and the PHY processor 130 generates the one or more PHY data units. For example, the MAC processor 126 may generate one or more MAC data units as discussed above, and the PHY processor 130 generates one or more PHY data units that include the one or more MAC data units generated by the MAC processor 126.

At block 712, the first communication transmits, or the first communication device is caused to transmit, the one or more data units generated at block 708 to inform a plurality of second communication devices (e.g., client stations 154) of the format of the MAC data unit for the UL MU transmission. For example, the PHY processor 130 may generate baseband signals corresponding to one or more PHY data units as discussed above, and provide the baseband signals to the circuitry that is configured to upconvert baseband signals to RF signals for transmission via the antennas 138, which causes the first communication device to transmit the RF signals.

In an embodiment, the one or more data units transmitted, or caused to be transmitted, at block 712 include a trigger frame that prompts the plurality of second communication devices (e.g., client stations 154) to transmit as part of an UL MU transmission to the AP 114. In another embodiment, the one or more data units transmitted, or caused to be transmitted, at block 712 include one or more of i) a beacon frame, ii) a probe response frame, iii) an association response frame, iv) a reassociation response frame, etc., that include the one or more parameters.

The one or more data units transmitted, or caused to be transmitted, at block 712 are PHY data units, or MAC data units included within PHY data units.

Figure 8:
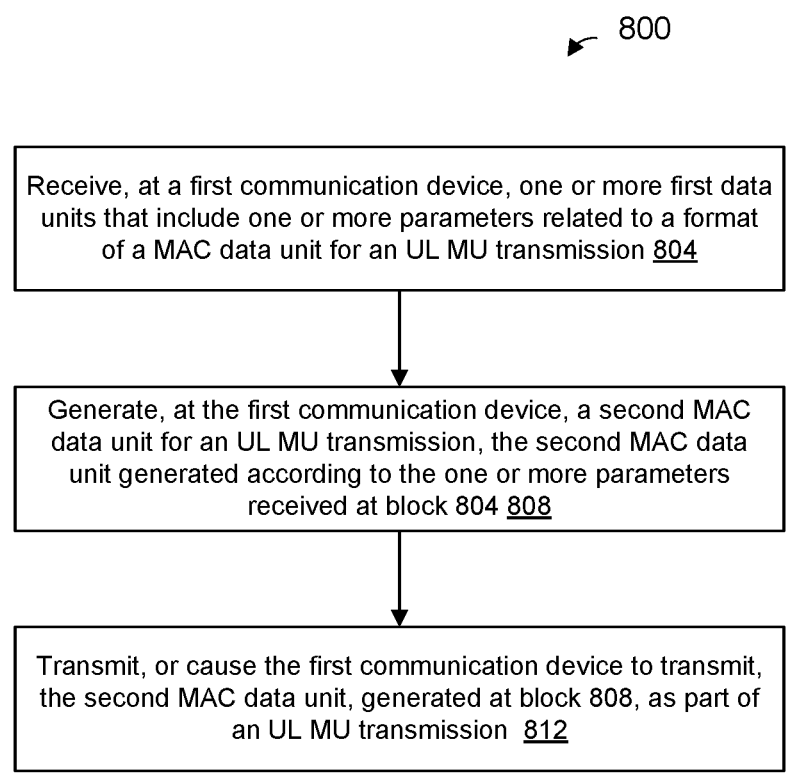
FIG. 8 is a flow diagram of an example method for generating a data unit for transmission as part of an UL MU transmission, according to an embodiment.

FIG. 8 is a flow diagram of an example method 800 for generating a data unit for transmission as part of an UL MU transmission, according to an embodiment. In some embodiments, the client station 154-1 of FIG. 1 is configured to implement the method 800. The method 800 is described in the context of the client station 154-1 merely for explanatory purposes and, in other embodiments, the method 800 is implemented by another suitable communication device.

At block 804, a first communication device (e.g., the client station 154-1) receives one or more first data units that includes one or more parameters related to a format of a MAC data unit for an UL MU transmission. In an embodiment, the format of the MAC data unit for the UL MU transmission is different than a format of a MAC data unit for an UL SU transmission.

In an embodiment, the one or more parameters include a parameter related to a minimum spacing between two adjacent MPDUs within A-MPDUs for UL MU transmissions. For example, the parameter related to the minimum spacing is a factor to be multiplied with a minimum spacing between two adjacent MPDUs in A-MPDUs for UL SU transmissions to determine the minimum spacing between two adjacent MPDUs in A-MPDUs for UL MU transmissions. As another example, the parameter related to the minimum spacing i) is the minimum spacing between two adjacent MPDUs in A-MPDUs for UL MU transmissions, and ii) is different than a minimum spacing between two adjacent MPDUs A-MPDUs for UL SU transmissions.

In another embodiment, the one or more parameters include a parameter indicating a number of communication devices participating in the UL MU transmission (e.g., Number of STAs), the parameter indicating the number of communication devices is for at least one of: i) adjusting a parameter related to a minimum spacing between two adjacent MAC protocol data units (MPDUs) in aggregated MPDUs (A-MPDUs) for UL SU transmissions to determine a parameter related to a minimum spacing between two adjacent MPDUs in A-MPDUs for UL MU transmissions, and ii) adjusting a parameter related to a maximum length of A-MPDUs for UL SU transmissions to determine a parameter related to a maximum length of A-MPDUs for UL MU transmissions.

In another embodiment, the one or more parameters include a parameter related to a maximum length of A-MPDUs for UL MU transmissions. For example, the parameter related to the maximum length of A-MPDUs for UL MU transmissions is a factor to be multiplied with, or to divide, a maximum length of A-MPDUs for UL SU transmissions to determine the maximum lengths of A-MPDUs for UL MU transmissions. In another example, the parameter related to the maximum length of A-MPDUs for UL MU transmissions is i) the maximum length of A-MPDUs for UL MU transmissions, and ii) different than a maximum length of A-MPDUs for UL SU transmissions.

In an embodiment, the one or more first data units include one or more MAC data units. For example, the one or more first data units a trigger frame that includes the one or more parameters, where the trigger frame is configured to prompt a plurality of communication devices (e.g., the client stations 154) to transmit as part of an UL MU transmission to the AP 114. As another example, the one or more first data units include one or more of i) a beacon frame, ii) a probe response frame, iii) an association response frame, iv) a reassociation response frame, etc., that include the one or more parameters.

In another embodiment, the one or more first data units include one or more PHY data units. For example, the one or more PHY data units may include a MAC trigger frame included within a PHY data unit. As another example, the one or more PHY data units may include, within the one or more PHY data units, one or more of i) a beacon frame, ii) a probe response frame, iii) an association response frame, iv) a reassociation response frame, etc.

At block 808, the first communication device generates one or more second MAC data units, for an UL MU transmission, that conform to the one or more parameters received at block 804. In an embodiment, the one or more second MAC data units include an A-MPDU that conforms to one or both of i) a minimum spacing between starts of MPDUs within the A-MPDU, and ii) a maximum length of the A-MPDU, as discussed above. For example, the MAC processor 166 generates an A-MPDU that conforms to one or both of i) a minimum spacing between starts of MPDUs within the A-MPDU, and ii) a maximum length of the A-MPDU, as discussed above.

At block 812, the first communication transmits, or the first communication device is caused to transmit, the second MAC data unit generated at block 808 as part of an UL MU transmission. For example, the PHY processor 170 may generate a PHY data unit that includes the second MAC data unit generated at block 808, including generating baseband signals corresponding to the PHY data unit; and the PHY processor 170 may provide the baseband signals to the circuitry that is configured to upconvert baseband signals to RF signals for transmission via the antennas 178, which causes the first communication device to transmit the RF signals.

In an embodiment, block 804 includes receiving a trigger frame, and block 812 includes the first communication transmitting, or the first communication device is caused to transmit, the second MAC data unit in response to the trigger frame. In another embodiment, block 812 includes the first communication transmitting, or the first communication device is caused to transmit, the second MAC data unit in response to a trigger frame received separately from the one or more first data units received at block 804.

In an embodiment, a method for communicating in a wireless communication network includes: determining, at a first communication device, one or more parameters related to a format of a media access control layer (MAC) data unit for an uplink (UL) multi-user (MU) transmission, wherein the format of the MAC data unit for the UL MU transmission is different than a format of a MAC data unit for an UL single user (SU) transmission; generating, at the first communication device, one or more data units that include the one or more parameters; and transmitting, by the first communication device, the one or more data units to a plurality of second communication devices to inform the plurality of second communication devices of the format of the MAC data unit for UL MU transmissions by the plurality of second communication devices to the first communication device.

In other embodiments, the method includes one of, or any suitable combination of two or more of, the following features.

The method further comprises receiving, at the first communication device, the UL MU transmission from the one or more second communication devices; wherein the UL MU transmission includes a plurality of MAC data units that conform to the format related to the one or more parameters.

The one or more parameters include one or more parameters related to a format of aggregated MAC protocol data units (MPDUs) (A-MPDUs) for UL MU transmissions.

The one or more parameters related to the format of A-MPDUs include a parameter related to a minimum spacing between two adjacent MPDUs within A-MPDUs for UL MU transmissions.

The parameter related to the minimum spacing is a factor to be multiplied with a minimum spacing between two adjacent MPDUs in A-MPDUs for UL SU transmissions to determine the minimum spacing between two adjacent MPDUs in A-MPDUs for UL MU transmissions.

The parameter related to the minimum spacing i) is the minimum spacing between two adjacent MPDUs in A-MPDUs for UL MU transmissions, and ii) is different than a minimum spacing between two adjacent MPDUs A-MPDUs for UL SU transmissions.

The one or more parameters related to the format of A-MPDUs include a parameter related to a maximum length of A-MPDUs for UL MU transmissions.

The parameter related to the maximum length of A-MPDUs for UL MU transmissions is a factor to be multiplied with, or to divide, a maximum length of A-MPDUs for UL SU transmissions to determine the maximum lengths of A-MPDUs for UL MU transmissions.

The parameter related to the maximum length of A-MPDUs for UL MU transmissions is i) the maximum length of A-MPDUs for UL MU transmissions, and ii) different than a maximum length of A-MPDUs for UL SU transmissions.

The one or more parameters include a parameter indicating a number of communication devices participating in the UL MU transmission; and the parameter indicating the number of communication devices is for at least one of i) adjusting a parameter related to a minimum spacing between two adjacent MAC protocol data units (MPDUs) in aggregated MPDUs (A-MPDUs) for UL SU transmissions to determine a parameter related to a minimum spacing between two adjacent MPDUs in A-MPDUs for UL MU transmissions, and ii) adjusting a parameter related to a maximum length of A-MPDUs for UL SU transmissions to determine a parameter related to a maximum length of A-MPDUs for UL MU transmissions.

The data unit is, or includes, a trigger frame configured to prompt the one or more second communication devices to transmit the UL MU transmissions.

The data unit is, or includes, one of a beacon frame, a probe response frame, an association response frame, or a reassociation response frame.

In another embodiment, an apparatus comprises a network interface device associated with a first communication device, the network interface device implemented using one or more integrated circuits (ICs). The network interface device includes: a media access control layer (MAC) processor implemented using the one or more ICs, and a physical layer (PHY) processor implemented using the one or more ICs. The one or more ICs are configured to: determine one or more parameters related to a format of a MAC data unit for an uplink (UL) multi-user (MU) transmission, wherein the format of the MAC data unit for the UL MU transmission is different than a format of a MAC data unit for an UL single user (SU) transmission; generate one or more data units that include the one or more parameters; and cause the first communication device to transmit the one or more data units to a plurality of second communication devices to inform the plurality of second communication devices of the format of the MAC data unit for UL MU transmissions by the plurality of second communication devices to the first communication device.

In other embodiments, the apparatus further comprises one of, or any suitable combination of two or more of, the following features.

The one or more parameters include one or more parameters related to a format of aggregated MAC protocol data units (MPDUs) (A-MPDUs) for UL MU transmissions.

The one or more parameters related to the format of A-MPDUs include a parameter related to a minimum spacing between two adjacent MPDUs within A-MPDUs for UL MU transmissions.

The parameter related to the minimum spacing is a factor to be multiplied with a minimum spacing between two adjacent MPDUs in A-MPDUs for UL SU transmissions to determine the minimum spacing between two adjacent MPDUs in A-MPDUs for UL MU transmissions.

The parameter related to the minimum spacing i) is the minimum spacing between two adjacent MPDUs in A-MPDUs for UL MU transmissions, and ii) is different than a minimum spacing between two adjacent MPDUs A-MPDUs for UL SU transmissions.

The one or more parameters include a parameter related to a maximum length of A-MPDUs for UL MU transmissions.

The parameter related to the maximum length of A-MPDUs for UL MU transmissions is a factor to be multiplied with, or to divide, a maximum length of A-MPDUs for UL SU transmissions to determine the maximum lengths of A-MPDUs for UL MU transmissions.

The parameter related to the maximum length of A-MPDUs for UL MU transmissions is i) the maximum length of A-MPDUs for UL MU transmissions, and ii) different than a maximum length of A-MPDUs for UL SU transmissions.

The one or more parameters include a parameter indicating a number of communication devices participating in the UL MU transmission; and the parameter indicating the number of communication devices is for at least one of i) adjusting a parameter related to a minimum spacing between two adjacent MAC protocol data units (MPDUs) in aggregated MPDUs (A-MPDUs) for UL SU transmissions to determine a parameter related to a minimum spacing between two adjacent MPDUs in A-MPDUs for UL MU transmissions, and ii) adjusting a parameter related to a maximum length of A-MPDUs for UL SU transmissions to determine a parameter related to a maximum length of A-MPDUs for UL MU transmissions.

The data unit is, or includes, a trigger frame configured to prompt the one or more second communication devices to transmit the UL MU transmissions.

The data unit is, or includes, one of a beacon frame, a probe response frame, an association response frame, or a reassociation response frame.

The data unit is a MAC data unit; and the PHY processor is configured to generate a PHY data unit that includes the MAC data unit.

The PHY processor comprises a plurality of transceivers.

The apparatus further comprises a plurality of antennas coupled to the plurality of transceivers.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any computer readable memory such as on a magnetic disk, an optical disk, or other storage medium, in a RAM or ROM or flash memory, processor, hard disk drive, optical disk drive, tape drive, etc. The software or firmware instructions may include machine readable instructions that, when executed by one or more processors, cause the one or more processors to perform various acts.

When implemented in hardware, the hardware may comprise one or more of discrete components, an integrated circuit, an application-specific integrated circuit (ASIC), a programmable logic device (PLD), etc.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A method for communicating in a wireless communication network, the method comprising:
   determining, at a first communication device, one or more parameters related to a format of aggregated media access control layer (MAC) protocol data units (A-MPDUs) for uplink (UL) multi-user (MU) transmissions, wherein the format of A-MPDUs for UL MU transmissions is different than a format of A-MPDUs for UL single user (SU) transmissions, wherein the one or more parameters include a first factor to be multiplied with a minimum spacing between two adjacent MAC protocol data units (MPDUs) in A-MPDUs for UL SU transmissions to determine a minimum spacing between two adjacent MPDUs in A-MPDUs for UL MU transmissions;
   generating, at the first communication device, one or more data units that include the one or more parameters; and
   transmitting, by the first communication device, the one or more data units to a plurality of second communication devices to inform the plurality of-second communication devices of the format of A-MPDUs for UL MU transmissions by the plurality of second communication devices to the first communication device.

2. The method of claim 1, further comprising, receiving, at the first communication device, an UL MU transmission from the plurality of second communication devices;
wherein the UL MU transmission from the plurality of second communication devices includes a plurality of A-MPDUs that conform to the format related to the one or more parameters.

3. The method of claim 1, wherein the one or more parameters related to the format of A-MPDUs further includes a second parameter related to a maximum length of A-MPDUs for UL MU transmissions.

4. The method of claim 3, wherein the second parameter related to the maximum length of A-MPDUs for UL MU transmissions is a factor to be multiplied with, or to divide, a maximum length of A-MPDUs for UL SU transmissions to determine the maximum lengths of A-MPDUs for UL MU transmissions.

5. The method of claim 3, wherein the second parameter related to the maximum length of A-MPDUs for UL MU transmissions is i) the maximum length of A-MPDUs for UL MU transmissions, and ii) different than a maximum length of A-MPDUs for UL SU transmissions.

6. The method of claim 1, wherein the one or more data units that include the one or more parameters includes a trigger frame configured to prompt the plurality of second communication devices to transmit an UL MU transmission.

7. The method of claim 1, wherein one or more data units that include the one or more parameters includes one of a beacon frame, a probe response frame, an association response frame, or a reassociation response frame.

8. An apparatus, comprising:
a network interface device associated with a first communication device, the network interface device implemented using one or more integrated circuits (ICs), wherein the network interface device includes:
a media access control layer (MAC) processor implemented using the one or more ICs, and
a physical layer (PHY) processor implemented using the one or more ICs;
wherein the one or more ICs are configured to:
determine one or more parameters related to a format of aggregated MAC protocol data units (A-MPDUs) for uplink (UL) multi-user (MU) transmissions, wherein the format of A-MPDUs for UL MU transmissions is different than a format of A-MPDUs for UL single user (SU) transmissions, wherein the one or more parameters include a first factor to be multiplied with a minimum spacing between two adjacent MAC protocol data units (MPDUs) in A-MPDUs for UL SU transmissions to determine a minimum spacing between two adjacent MPDUs in A-MPDUs for UL MU transmissions,
generate one or more data units that include the one or more parameters, and
cause the first communication device to transmit the one or more data units to a plurality of second communication devices to inform the plurality of second communication devices of the format of A-MPDUs for UL MU transmissions by the plurality of second communication devices to the first communication device.

9. The apparatus of claim 8, wherein the one or more parameters further include a second parameter related to a maximum length of A-MPDUs for UL MU transmissions.

10. The apparatus of claim 9, wherein the second parameter related to the maximum length of A-MPDUs for UL MU transmissions is a factor to be multiplied with, or to divide, a maximum length of A-MPDUs for UL SU transmissions to determine the maximum lengths of A-MPDUs for UL MU transmissions.

11. The apparatus of claim 9, wherein the second parameter related to the maximum length of A-MPDUs for UL MU transmissions is i) the maximum length of A-MPDUs for UL MU transmissions, and ii) different than a maximum length of A-MPDUs for UL SU transmissions.

12. The apparatus of claim 8, wherein the one or more data units that include the one or more parameters includes a trigger frame configured to prompt the plurality of second communication devices to transmit an UL MU transmission.

13. The apparatus of claim 8, wherein the one or more data units that include the one or more parameters includes one of a beacon frame, a probe response frame, an association response frame, or a reassociation response frame.

14. The apparatus of claim 8, wherein:
the one or more data units that include the one or more parameters includes an MPDU that include the one or more parameters; and
the PHY processor is configured to generate a PHY data unit that includes the MPDU that include the one or more parameters.

15. The apparatus of claim 8, wherein:
the PHY processor comprises a plurality of transceivers.

16. The apparatus of claim 15, further comprising:
a plurality of antennas coupled to the plurality of transceivers.

* * * * *